United States Patent
Fry et al.

(10) Patent No.: US 7,925,409 B2
(45) Date of Patent: Apr. 12, 2011

(54) TRAILER ELECTRONIC BRAKING SYSTEM

(75) Inventors: Matthew Fry, Wraxall (GB); Martin Mederer, Neumarkt (DE); Kornel Straub, Pomáz (HU); Valer Merza, Szentendre (HU); Gergely Szabo, Budapest (HU)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 12/561,631

(22) Filed: Sep. 17, 2009

(65) Prior Publication Data

US 2010/0070149 A1    Mar. 18, 2010

Related U.S. Application Data

(63) Continuation of application No. PCT/GB2008/001007, filed on Mar. 25, 2008.

(30) Foreign Application Priority Data

Mar. 22, 2007  (GB) .................................. 0705520.5

(51) Int. Cl.
*G06G 7/00* (2006.01)
(52) U.S. Cl. ...................... 701/70; 180/14.6; 280/432
(58) Field of Classification Search .................. 701/70; 303/9.71, 3, 7, 123, 139–140; 73/121; 188/182, 188/137, 110; 340/52; 180/14.6; 280/427, 280/423.1, 432; 307/9.1
See application file for complete search history.

(56) References Cited

U.S. PATENT DOCUMENTS

| | | | | |
|---|---|---|---|---|
| 4,023,863 A | * | 5/1977 | Sisson et al. | 303/7 |
| 4,196,936 A | * | 4/1980 | Snyder | 303/20 |
| 4,232,910 A | * | 11/1980 | Snyder | 303/123 |
| 4,706,984 A | * | 11/1987 | Esler et al. | 280/432 |
| 5,139,374 A | * | 8/1992 | Holt et al. | 410/64 |
| 5,380,072 A | * | 1/1995 | Breen | 303/7 |
| 5,403,073 A | | 4/1995 | Frank et al. | |

(Continued)

FOREIGN PATENT DOCUMENTS

DE    10 2004 036 089 A1    2/2006

(Continued)

OTHER PUBLICATIONS

Laser Scanner-Based Navigation for Commercial Vehicles; Stahn, R. et al.; Intelligent Vehicles Symposium, 2007 IEEE; Digital Object Identifier: 10.1109/IVS.2007.4290242; Publication Year: 2007, pp. 969-974.*

(Continued)

*Primary Examiner* — Cuong H Nguyen
(74) *Attorney, Agent, or Firm* — Crowell & Moring LLP

(57) ABSTRACT

A trailer electronic braking system is provided for a road train having a tractor and a plurality of trailers. The braking system includes a braking ECU on each trailer and a communication interface being provided so that the braking ECU on a first trailer and the braking ECU on a second trailer are able to communicate with one another. In use, the respective braking ECU on the first and second trailer receive an input from a respective sensor on the first and second trailer adapted to detect lateral acceleration and/or wheel speed. In the event that one of the sensors detects lateral acceleration and/or a wheel speed indicative of a loss of stability, the sensor generates a signal for actuating stability control, which signal is passed via the communication interface to the braking ECU on the other trailer, so that the other trailer can actuate stability control.

12 Claims, 2 Drawing Sheets

U.S. PATENT DOCUMENTS

| | | | |
|---|---|---|---|
| 5,588,716 A | | 12/1996 | Stumpe |
| 5,739,592 A | * | 4/1998 | Rigsby et al. .................. 307/9.1 |
| 5,861,802 A | * | 1/1999 | Hungerink et al. ........... 340/431 |
| 6,225,894 B1 | | 5/2001 | Kyrtsos |
| 6,452,485 B1 | * | 9/2002 | Schutt et al. .................. 340/431 |
| 6,466,028 B1 | * | 10/2002 | Coppinger et al. ........... 324/504 |
| 6,499,814 B1 | * | 12/2002 | Mixon .......................... 303/124 |
| 6,501,376 B2 | | 12/2002 | Dieckmann et al. |
| 6,523,911 B1 | * | 2/2003 | Rupp et al. ........................ 303/7 |
| 6,655,710 B2 | * | 12/2003 | Lindell et al. ................. 280/419 |
| 7,284,802 B2 | * | 10/2007 | Ziegler et al. ..................... 303/7 |
| 7,561,953 B2 | * | 7/2009 | Yu .................................. 701/78 |
| 7,798,263 B2 | * | 9/2010 | Tandy et al. .................. 180/14.6 |
| 2003/0160428 A1 | * | 8/2003 | Lindell et al. ................. 280/432 |
| 2006/0173584 A1 | * | 8/2006 | Einig et al. ......................... 701/1 |
| 2006/0206253 A1 | * | 9/2006 | Yu .................................. 701/70 |
| 2006/0244579 A1 | * | 11/2006 | Raab .............................. 340/438 |
| 2007/0260385 A1 | * | 11/2007 | Tandy et al. .................... 701/70 |
| 2008/0255741 A1 | * | 10/2008 | Traechtler ....................... 701/70 |
| 2010/0007200 A1 | * | 1/2010 | Pelosse ............................. 303/7 |
| 2010/0066161 A1 | * | 3/2010 | Fry et al. ....................... 303/9.66 |
| 2010/0070149 A1 | * | 3/2010 | Fry et al. ......................... 701/70 |

FOREIGN PATENT DOCUMENTS

| | | |
|---|---|---|
| EP | 0 478 952 A1 | 4/1992 |
| EP | 0 603 493 A2 | 6/1994 |
| EP | 1 186 510 A1 | 3/2002 |
| WO | WO 2007/008150 A1 | 1/2007 |

OTHER PUBLICATIONS

Speed control experiments with an automated heavy vehicle; Tan, Y. et al.; Control Applications, 1999. Proceedings of the 1999 IEEE International Conference on; vol. 2; Digital Object Identifier: 10.1109/CCA.1999.801169; Publication Year: 1999, pp. 1353-1358, vol. 2.*

Accuracy improvement method for vehicle detection using optical sensors; Kovavisaruch, L. et al.; Intelligent Transport Systems Telecommunications,(ITST),2009 9th International Conference on; Digital Object Identifier: 10.1109/ITST.2009.5399352 Publication Year: 2009, pp. 218-222.*

Navigating an articulated vehicle and reversing with a trailer; Larsson, U. et al.; Robotics and Automation, 1994. Proceedings., 1994 IEEE International Conference on; Digital Object Identifier: 10.1109/ROBOT.1994.351152; Publication Year: 1994, pp. 2398-2404 vol. 3.*

SAE Technical Paper Series, Parametric Study on Vehicle-Trailer Dynamics for Stability Control; SAE International, Warrendale, PA; Copyright 2003. cited by other.*

A Hardware in Loop Test System for Pneumatic Anti-lock Brake System; Wu Chao et al.; Measuring Technology and Mechatronics Automation (ICMTMA), 2010 International Conference on; vol. 1; Digital Object Identifier: 10.1109/ICMTMA.2010.513; Publication Year: 2010, pp. 105-108.*

Anti-rollover control algorithm for heavy semi-trailer based on LQG; Zhixin Yu et al.; Information and Automation (ICIA), 2010 IEEE International Conference on; Digital Object Identifier: 10.1109/ICINFA.2010.5512262; Publication Year: 2010, pp. 1593-1596.*

Modelling and Active Safe Control of Heavy Tractor Semi-Traile; Zhu Tianjun; Zong Changfu; Intelligent Computation Technology and Automation, 2009. ICICTA '09. Second International Conference on; vol. 2; Digital Object Identifier: 10.1109/ICICTA.2009.264; Publication Year: 2009, pp. 112-115.*

Automata-based modeling and control of a truck and trailer vehicle equipped with a kingpin sliding mechanism; Manesis, S.; Deligiannis, V.; Emerging Technologies & Factory Automation, 2009. ETFA 2009. IEEE Conference on; Digital Object Identifier: 10.1109/ETFA.2009.5347256; Publication Year: 2009, pp. 1-4.*

Estimation of Articulation Angle for Tractor Semi-trailer Based on State Observer; Liang Chu; Yong Fang; Mingli Shang; Jianhua Guo; Feikun Zhou; Measuring Technology and Mechatronics Automation (ICMTMA), 2010 International Conference on vol. 2; Digital Object Identifier: 10.1109/ICMTMA.2010.342; Publication Year: 2010, pp. 158-163.*

Steering and braking control of tractor-semitrailer vehicles in automated highway systems; Chieh Chen; Tomizuka, M.; American Control Conference, 1995. Proceedings of the; vol. 1; Digital Object Identifier: 10.1109/ACC.1995.529332 Publication Year: 1995, pp. 658-662 vol. 1.*

Development and modelling of an electropneumatic brake system; Karthikeyan, P.; Subramanian, S.C.; Intelligent Vehicles Symposium, 2009 IEEE; Digital Object Identifier: 10.1109/IVS.2009.5164392; Publication Year: 2009, pp. 858-863.*

Great Britain Search Report dated Jul. 19, 2007 (One (1) page).
International Search Report dated Jul. 3, 2008 (Three (3) pages).
PCT/ISA/237 Written Opinion (Seven (7) pages).

* cited by examiner

TRAILER ELECTRONIC BRAKING SYSTEM

CROSS-REFERENCE TO RELATED APPLICATIONS

This application is a continuation of PCT International Application No. PCT/GB2008/001007, filed Mar. 25, 2008, which claims priority under 35 U.S.C. §119 to Great Britain Patent Application No. GB 0705520.5, filed Mar. 22, 2007, the entire disclosures of which are herein expressly incorporated by reference.

This application contains subject matter related to U.S. application Ser. No. 12/561,654, entitled "Trailer Electronic Braking System," filed on even date herewith.

BACKGROUND AND SUMMARY OF THE INVENTION

The invention relates to a trailer electronic braking system for motor vehicles having a plurality of trailers.

In Australia and North America, vehicles consisting of a tractor unit and two or more trailers are commonly utilised and these are collectively termed "road trains". Road trains are not currently permitted in Western Europe due to weight limits on the size of vehicles; however, due to the environmental and cost advantages of road trains, it is likely that this will change.

In all these territories there are a large number of small engineering companies building trailers for various tractors employing compressed air operable brakes. Such trailer builders tend to specialize in specific vehicle types, but to meet statutory requirements, it is a common feature that trailers are provided with means which control the braking force signaled from a towing tractor. These trailer braking systems are now invariably electronic braking systems (EBS) having electronic control by an ECU. It is now routine that the electronic braking systems can incorporate features such as stability control. Stability control has proved to be a major safety enhancement.

Tractors are commonly provided with electronic stability control such as ESP®, which can generate an additional brake demand on the trailer but cannot provide full stability control on the trailer, only on the tractor. Trailers are therefore provided with roll stability control (RSP). Trailer Roll stability control monitors the lateral acceleration on the trailer as a build-up of lateral acceleration leads to a rollover of the trailer, as well as providing selective brake application and monitoring wheel speeds to detect any wheel lift which generates abnormal rotational speeds. The commonest rollover situations include where a driver steers rapidly in one direction and then back in the opposite direction, for example to avoid an obstruction on the motorway. In this situation, the ECU is able to make a predictive intervention to stabilize the vehicle by controlling the brake force at either an axle or individual wheel level. The other common rollover situation is where there is a slow build-up of lateral acceleration on the trailer on, for example, a motorway exit, where a small selective brake application to the inside (with respect to the curve) wheels may result in a large change in velocity. In this case, the ECU can apply a large brake effort to stabilize the vehicle.

Known RSP systems suffer from the problem that they cannot simply be extended to road trains as due to the increased size of the vehicle, it may take too long for the lateral acceleration signal to be measured, processed and the brake demand adjusted before the rollover event occurs. This will be particularly the case if the center of gravity of the vehicle is towards the rear of the train.

The present invention therefore seeks to provide a trailer electronic braking system adapted to provide roll stability control for road trains.

According to the invention, there is provided a trailer electronic braking system for motor vehicles having a plurality of trailers, the braking system comprising a braking device capable of generating brake force on an axle on each trailer, the brake force into the brake being controllable by a braking ECU on each trailer, a communication interface being provided so that the braking ECU on a first trailer and the braking ECU on a second trailer are able to communicate with one another. The respective braking ECU on the first and second trailer receive an input from a respective sensor on the first and second trailer adapted to detect lateral acceleration and/or wheel speed, wherein, in the event that one of the sensors detects lateral acceleration and/or a wheel speed indicative of a loss of stability, the sensor generates a signal for actuating stability control, which signal is passed via the communication interface to the braking ECU on the other trailer, so that the other trailer can actuate stability control.

Preferably, the communication interface is a CAN bus or powerline carrier. Preferably, the sensor is a lateral acceleration sensor and/or two or more wheel speed sensors. Preferably, the sensor generates a signal only when the lateral acceleration detected exceeds a predetermined threshold. Preferably, if the sensor on the second trailer detects no lateral acceleration, the brake pressure is not increased. Alternatively, if the sensor of the second trailer detects no lateral acceleration the brake force is increased to a level intermediate to the force on the first trailer. Preferably, the braking ECU monitors the wheel speed on its trailer, wherein stability control is initiated as a function of whether the vehicle is braked or unbraked through a braking intervention by monitoring the rotational wheel speed behaviour. Preferably in a case of a braked vehicle, the brake force is lowered at the brake cylinder of the wheel on the inside of a turn and a stability control event initiated if the rotational speed of the wheel increases by less than a predetermined amount.

The invention advantageously improves vehicle stability control in a road train as the risk of braking the trailer individually can lead to instability in the other trailers on the road train thereby increasing the risk of rollover. The invention also advantageously decreases the time between lateral acceleration on the train being detected and stability control being initiated.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
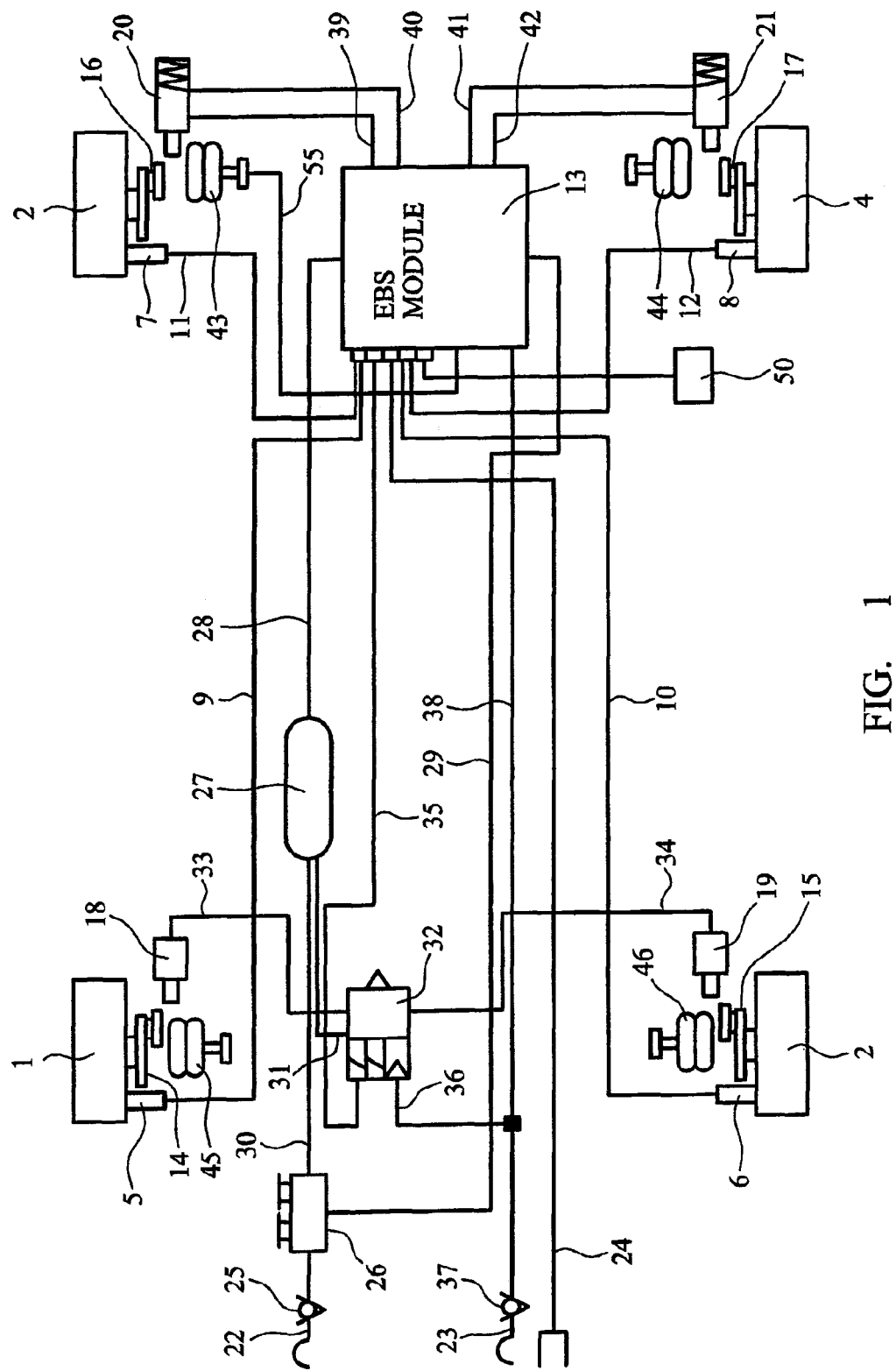
FIG. 1 shows a trailer electronic braking system.

FIG. 1 shows a trailer electronic braking system in which the utility or commercial vehicle trailer has a steerable front axle with front wheels 1, 2 and a rear axle with rear wheels 3, 4. Rotational wheel speed sensors 5-8 are in each case assigned to the front wheels 1, 2 and the rear wheels 3, 4, and are connected by way of electric lines 9-12 with an electropneumatic brake force control module 13 (EBS module), which is primarily assigned to the rear axle brakes. One brake 14-17 is in each case assigned to the front wheels 1, 2 and the rear wheels 3, 4, which brake 14-17 can be applied by way of brake cylinders 18, 19 of the front axle or spring-loaded brake cylinders 20, 21 of the rear axle.

The braking system of the trailer vehicle can be connected by way of three connections, specifically a pneumatic supply line connection 22, a pneumatic control line connection 23 and an electric control connection 24, with the braking system of a tractor or a further trailer.

The supply line connection 22 is connected by way of a return valve 25 and a parking valve 26 with an air brake reservoir 27. From the air brake reservoir 27, a pneumatic line 28, 31 leads to a supply input of the pressure control module 13 and ABS valve 32. In addition, a pneumatic line 29 branches off the parking valve 26 to the pressure control module 13. A pneumatic line 30 extends between the parking valve 26 and the air brake reservoir 27.

The ABS valve 32 is assigned jointly to both brake cylinders 18, 19 of the front axle and is connected with the brake cylinder 18 by way of a pneumatic line 33 and with the brake cylinder 19 by way of a pneumatic line 34. The ABS valve 32 has two electric control inputs which are connected by way of "one" electric line 35 (shown here only schematically) with the pressure control module 13.

Furthermore, the ABS valve 32 has a pneumatic control input 36 which is connected by way of a return valve 37 with the pneumatic control connection 23. The pneumatic control input 36 is also connected by way of a pneumatic control line 38 with a pneumatic control input of the pressure control module 13. The pressure control module 13 has an integrated pressure sensor (not shown), which measures the pressure in the pneumatic control line 38, that is, the control pressure present at the pneumatic control input 36 of the ABS valve, which control pressure is identical to the maximal pressure which can be controlled into the brake cylinders 18, 19.

The pressure control module 13 has pneumatic outputs 39 42, which are connected by way of assigned pneumatic lines with the spring brake cylinders 20 or 21.

Furthermore, pneumatic axle load sensors or air bellows 43 44 are provided at the rear axle and permit a determination of the axle load, particularly of the dynamic axle load during braking and starting. The axle load sensors 43 44 are connected by way of electric lines with the pressure control module 13 which is shown here only as an example by way of the electric line 55. Correspondingly, axle load sensors 45, 46 may be provided at the front axle. However, these axle load sensors 45,46 are not absolutely necessary.

To provide stability control, a lateral acceleration sensor 50 is provided, which may also be integrated with a yaw sensor, and the output of the lateral acceleration sensor is fed to the pressure control module/ECU 13. Typically, the lateral acceleration sensor 50 is integrated into the pressure control module/ECU 13. In the event that lateral acceleration on the trailer is detected, the pressure control module can provide for increased brake force at the front and/or rear axles. When the lateral acceleration sensor 50 detects lateral acceleration on the trailer in which it is installed, the sensor generates a signal setting the stability control to active.

With respect to the embodiment described in FIG. 1, the ABS valve 32 may be replaced with an electro-pneumatic valve where the electric control line 35 consists of a communication interface, preferably a CAN and an electric power source.

Figure 2:
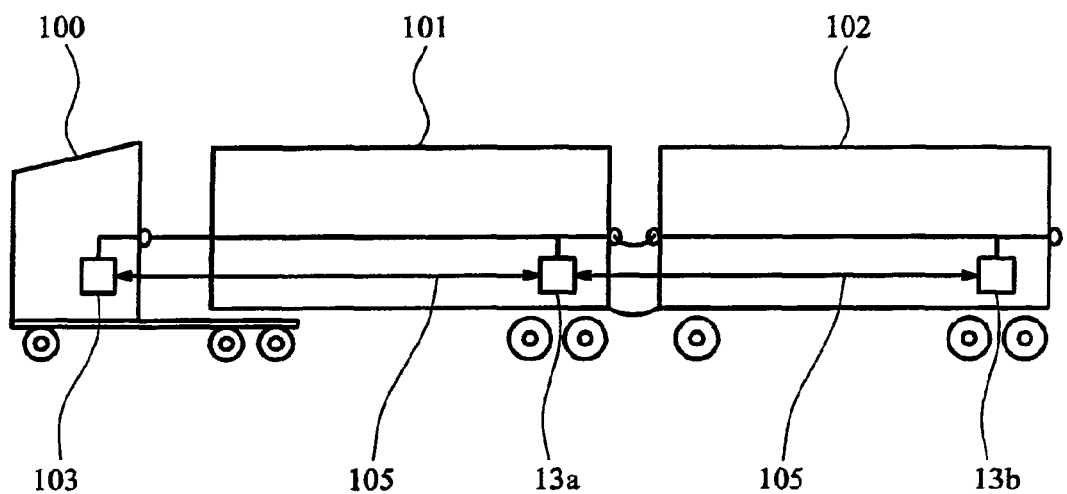
FIG. 2 shows a schematic of a road train complying with ISO 11992.
Figure 3:
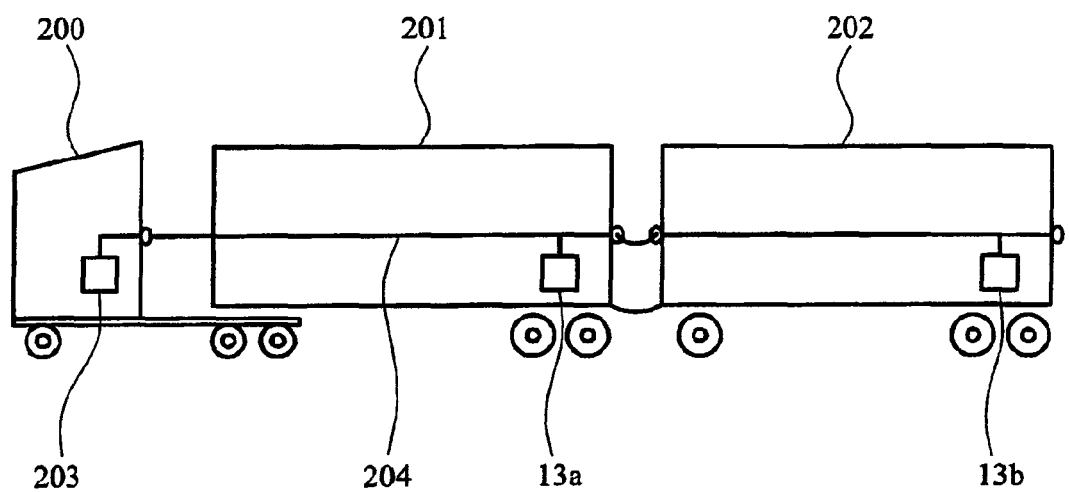
FIG. 3 shows a schematic of a road train complying with J2497 SAE.

FIGS. 2 and 3 show schematically how the signals can be processed in a road train based on the International standard governing communications between tractors and trailers, ISO11992 and the US standard for governing communications between tractors and trailers J2497SAE.

FIG. 2 shows schematically a tractor unit 100 connected to a first trailer 101, which in turn is connected to a second trailer 102. The tractor 100 is provided with a braking ECU 103 and the trailers 101 and 102 are provided with a braking ECU 13a and 13b, respectively, described in greater detail above. Pursuant to ISO 7638, a separate power line is provided along the length of the road train to provide power to the braking ECUs. Communication between the ECUs is via a CAN bus 105. In the event that the lateral acceleration sensor on the first trailer 101 detects lateral acceleration, a vehicle dynamic control signal setting the vehicle dynamic control (VDC) parameter to active is sent both ways on the CAN bus 105. If the lateral acceleration sensor on the second trailer 102 detects lateral acceleration, the signal setting the VDC parameter to active is sent via the CAN bus 105 to the first trailer 101 and then to the tractor 100. The signal does not have to provide further information such as purpose. If the braking ECU 13a,b or 103 detects a VDC active parameter, stability control can be activated. The tractor 100 can therefore perform functions such as disabling cruise control and stopping the gearbox from downshifting when the brakes are applied.

FIG. 3 shows schematically a road train using a powerline carrier in accordance with the SAE standard J2497, including a tractor 200, first trailer 201 and second trailer 202. The tractor 200 and first and second trailers are provided with respective brakings ECU 203 and 13a,b, but in this case the communication between the braking ECUs is via the powerline 204 rather than via a separate CAN bus. In this case, the lateral acceleration sensors are adapted to provide a stability control actuation signal which is passed down the powerline to the adjacent trailer and to the tractor.

In both of the embodiments described with respect to FIGS. 2 and 3, in the event that the lateral acceleration sensor 50 on only one of the trailers in the road train detects lateral acceleration or an RSP event, then by setting the stability control actuation signal to active, roll stability control can be actuated on both trailers. The stability control on one trailer is therefore actuatable based on information from the communication interface rather than from the sensors on that trailer.

In the event that lateral acceleration is detected in only one of the trailers independently of the order of the trailers in the road train, the effectiveness of the roll stability control intervention can be enhanced by modifying the thresholds on the roll stability control program of the unaffected trailer based on data from the affected trailer. In addition to the lateral acceleration, this data would include the wheel speeds and angles and yaw angle (if a yaw sensor is present). If the unaffected trailer detects no lateral acceleration and the wheel speed and angles are within acceptable predetermined limits, then the brake pressure in the unaffected trailer could be maintained, i.e. no additional braking effort applied or alternatively a reduced braking effort. The stability of the whole road train can therefore be improved with respect to the use of roll stability on a single trailer.

In the above description of a specific embodiment of the invention, it has been assumed that there is a separate lateral acceleration sensor installed on each of the trailers. However it is also possible to detect instability when two or more wheel speed sensors are installed on the same trailer. Although the system has been specifically described as relating to an electropneumatic brake system, it is equally applicable in a fully electric brake system.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A trailer electronic braking system for a motor vehicle having at least first and second trailers, the trailer electronic braking system comprising:
   a first braking ECU on the first trailer;
   a second braking ECU on the second trailer, the first and second braking ECUs being operatively configured to control a brake force into a brake;
   a communication interface coupling the first braking ECU on the first trailer and the second braking ECU on the second trailer so that the first and second braking ECUs are able to communicate with one another;
   a first sensor associated with the first trailer being adapted to detect at least one of lateral acceleration and wheel speed;
   a second sensor associated with the second trailer being adapted to detect at least one of lateral acceleration and wheel speed;
   wherein the respective braking ECUs on the first trailer and the second trailer receive an input from a corresponding to one of the sensors on the first trailer and the second trailer; and
   wherein, in an event that one of the first and second sensors detects lateral acceleration and/or wheel speed indicative of a loss of stability, said sensor generates a signal for actuating stability control, which signal is passed via the communication interface to the braking ECU on the other trailer in order for the other trailer to actuate stability control.

2. The trailer electronic braking system according to claim 1, wherein the communication interface is one of a CAN bus and powerline carrier.

3. The trailer electronic braking system according to claim 1, wherein the sensor is at least one of a lateral acceleration sensor and a plurality of wheel speed sensors.

4. The trailer electronic braking system according to claim 2, wherein the sensor is at least one of a lateral acceleration sensor and a plurality of wheel speed sensors.

5. The trailer electronic braking system according to claim 1, wherein the sensor generates a signal only when the lateral acceleration detected exceeds a predetermined threshold.

6. The trailer electronic braking system according to claim 2, wherein the sensor generates a signal only when the lateral acceleration detected exceeds a predetermined threshold.

7. The trailer electronic braking system according to claim 1, wherein if the sensor on the trailer that receives the passed signal detects no lateral acceleration or a lateral acceleration below a predetermined threshold, the brake force is not increased.

8. The trailer electronic braking system according to claim 2, wherein if the sensor on the trailer that receives the passed signal detects no lateral acceleration or a lateral acceleration below a predetermined threshold, the brake force is not increased.

9. The trailer electronic braking system according to claim 1, wherein if the sensor of the trailer receiving the passed signal detects no lateral acceleration or lateral acceleration below a predetermined threshold, the brake force is increased to a level intermediate the brake force of the other trailer.

10. The trailer electronic braking system according to claim 2, wherein if the sensor of the trailer receiving the passed signal detects no lateral acceleration or lateral acceleration below a predetermined threshold, the brake force is increased to a level intermediate the brake force of the other trailer.

11. The trailer electronic braking system according to claim 1, wherein the respective braking ECUs monitor wheel speed on the respective trailers and initiate stability control as a function of whether the vehicle is being braked through a braking intervention by monitoring rotational wheel speed behavior.

12. The trailer electronic braking system according to claim 1, wherein, in a case of a braked vehicle, the brake force is lowered at a brake cylinder of the wheel on an inside of a turn, and a stability control event is initiated if a rotational speed of the wheel increases by less than a predetermined amount.

* * * * *